United States Patent
Watson, Jr.

(10) Patent No.: US 6,453,473 B1
(45) Date of Patent: Sep. 17, 2002

(54) ACCESS DEVICE AND SYSTEM FOR MANAGING TELEVISION AND DATA COMMUNICATIONS THROUGH A CABLE TELEVISION NETWORK

(76) Inventor: John C. Watson, Jr., 110 Mayberry Rd., Gray, ME (US) 04039

( * ) Notice: Subject to any disclaimer, the term of this patent is extended or adjusted under 35 U.S.C. 154(b) by 0 days.

(21) Appl. No.: 09/153,800

(22) Filed: Sep. 15, 1998

(51) Int. Cl.$^7$ ............................ H04N 7/16; H04N 7/173
(52) U.S. Cl. ........................ 725/120; 725/119; 725/127; 725/149
(58) Field of Search .......................... 725/25, 106, 111, 725/119, 120, 127, 149; H04N 7/16, 7/173

(56) References Cited

U.S. PATENT DOCUMENTS

| | | |
|---|---|---|
| 5,289,271 A | 2/1994 | Watson |
| 5,414,773 A | 5/1995 | Handelman |
| 5,481,757 A * | 1/1996 | Mihara et al. ............. 725/119 |
| 5,689,799 A | 11/1997 | Dougherty et al. |
| 5,699,105 A | 12/1997 | Chen et al. |
| 5,714,945 A | 2/1998 | Sakuma et al. |
| 5,719,872 A * | 2/1998 | Dubberly et al. ........... 370/487 |
| RE35,740 E | 3/1998 | Piasecki et al. |
| 5,737,397 A | 4/1998 | Skinner et al. |
| 5,760,822 A | 6/1998 | Coutinho |
| 5,893,024 A * | 4/1999 | Sanders et al. ............. 725/125 |
| 6,112,232 A * | 8/2000 | Shahar et al. ............... 709/217 |
| H1858 H * | 9/2000 | Ibelings ...................... 725/121 |
| 6,266,816 B1 * | 7/2001 | Watson et al. .............. 725/120 |

\* cited by examiner

*Primary Examiner*—Andrew Faile
*Assistant Examiner*—Andrew Y. Koenig
(74) *Attorney, Agent, or Firm*—William B. Ritchie

(57) ABSTRACT

An access device for use with a cable television communications network and a network utilizing such a device. The network includes a cable head end in communication with a television source and a data source and a trunk feed cable. At least one access device is placed in communication with the trunk feed cable. The access device includes an upstream frequency translator, a communications modem, a television band pass filter, a non-television band pass filter, a downstream frequency and a microprocessor for allocating frequency slots for the subscriber, setting the upstream frequency translator. At least one drop cable is in communication with the access device and a subscriber cable modem. In operation, the subscriber sends a service request from the computer, the subscriber cable modem converts the service request signal from the computer and sends the converted signal through the drop cable to the access device. The access device translates the service request signal to a first predetermined frequency and sends the service request signal through the communications modem to the data source via the trunk cable and the head end. The data source responds to the service request signal and sends a cable television network signal through the head end and the trunk cable back to the access device. The access device filters a television signal and a data signal, translates the data signal to a second predetermined frequency, and sends the translated data signal to the subscriber cable modem through the drop cable.

18 Claims, 3 Drawing Sheets

ACCESS DEVICE AND SYSTEM FOR MANAGING TELEVISION AND DATA COMMUNICATIONS THROUGH A CABLE TELEVISION NETWORK

FIELD OF THE INVENTION

The present invention relates to the field of data communication through cable television networks and, in particular, to an access device for enhancing security of data transmitted through cable television networks.

BACKGROUND OF THE INVENTION

In recent years, increased utilization of the Internet as a means of transmitting information has revealed inadequacies in existing twisted pair telephone systems for transmitting and receiving data. As sources of information have increased their availability of information, not just incrementally but multiple orders of magnitude, users of this information have demanded commensurate increases in the rate of delivery of the desired information.

In an attempt to meet this demand, existing twisted pair telephony systems have moved from a data transmission rate of 300 bps to rates in excess of 28.8 Kbps (the EIA-V.34 standard) over standard phone lines. Further incremental increases in data transmission rates can be achieved by utilizing specially conditioned lines and various modulation schemes. However, these increases also will involve significant increases in cost of service.

The cost/performance constraints of current telephone systems has led to the use of cable television lines for transmitting data. By utilizing community antenna television (CATV) modems, a nominal increase in the data transmission rate from 28.8 Kbps to 10 Mbps has been achieved; an increase of from 300 to 500 times. The bandwidth of the installed base varies from 300 MHz to 1.2 GHz, with a high bandwidth capacity and the ability to increase that bandwidth in the future. The information industry has recognized this potential and various enterprises have developed cable modems for this purpose. However, current cable television systems have inherent drawbacks relating to the transmission and reception of data.

One drawback in utilizing cable television systems for data traffic is the decrease in security of the transmitted data. Security, in this sense, has a number of different components. First, transmitted data should be secure from tampering and therefore the service should be secure from unauthorized entry into at both the physical and the functional levels. Second, the system should be secure from a time and control standpoint. In other words, a user should be authenticated before entry is authorized and entry should be provided at the appropriate level and in a timely manner. Finally, unauthorized third parties should be prevented from reading transmitted data.

Current cable television networks do not meet these requirements due to the nature of the service itself. Current systems send all data signals through the tunk cable directly to the subscriber's modem, which in turn filters the signal to a preset frequency and passes the corresponding data to the computer. Given this arrangement, a hacker can intercept third party data or service requests. In addition, a hacker could "piggyback" along with an authenticated user and, once inside the password protected data network, access and/or tamper with sensitive data.

Another drawback of current cable television networks is the lack of electrical isolation between the subscriber and the trunk cable used to transmit the data. This lack of electrical isolation allows electrical noise, such as is created by household appliances such as hair dryers, vacuum cleaners, or the like, to corrupt the signals being passed through the trunk cable and degrade system performance.

Therefore, there is a need for an apparatus for efficiently accessing, managing, and protecting information communicated over cable television networks that isolates each subscriber such that unauthorized access to, and/or tampering with, third parties' data is prevented and such that unwanted electrical noise is not imparted to the network.

SUMMARY OF THE INVENTION

The present invention is an access device for use with a cable television communications network and a network utilizing such a device. In its most basic form, the network includes a cable head end in communication with a television source and a data source. A trunk feed cable is in communication with the cable head end and is utilized for carrying a cable television network signal that includes a television signal and a data signal to at least one subscriber. At least one access device is placed in communication with the trunk feed cable. The access device includes an upstream frequency translator for translating a subscriber service request signal to a first predetermined frequency, a communications modem for sending the translated subscriber request signal to the data source, receiving the cable television network signal from the data source, and sending a subscriber termination signal to indicate a termination of service. A television band pass filter is included in the access device for filtering the composite television signal band from the cable television network in a non-modified form and a non-television band pass filter for filtering a data signal from the cable television network signal. A downstream frequency translator translates the filtered data signal from the cable television signal band to a second predetermined frequency. The access device also includes a microprocessor for generating the allocated frequency slots assigned to the subscriber by the head end, setting the upstream frequency translator to translate the subscriber service request signal to the first predetermined frequency, and setting the downstream frequency translator to translate the data signal to the second predetermined frequency. The network further includes at least one drop cable in communication with the access device for transmitting the television signal and the translated data signal from the access device to the subscriber and for sending the service request signal from the subscriber to the access device. Finally, the network also includes a subscriber cable modem in communication with the drop cable for receiving and converting the translated data signal from the access device into a computer readable form and for converting a service request signal from the computer and sending the converted signal to the access device.

In operation, the subscriber sends a service request from the computer, the subscriber cable modem converts the service request signal from the computer and sends the converted signal through the drop cable to the access device. The access device then requests both upstream and downstream frequency slots from the head end. This authorizatoin and allocation is accomplished via a low speed data modem utilizing the service channel on the trunk cable. The data source responds to the service request signal and send a cable television network signal through the head end and the trunk cable back to the access device. The access device then filters a television signal and a data signal, translates the data signal to a second predetermined frequency, and sends the translated data signal to the subscriber cable modem through the drop cable. The subscriber cable modem then converts the translated data signal into a computer readable form and sends the converted-data signal to the computer.

Therefore, it is an aspect of the invention to provide an apparatus for managing data over a CATV system that is outside the physical control/access of the user, but is installed in the close proximity to the user.

It is a further aspect of the invention to provide an apparatus for managing data over a CATV system that may be mounted on a pole, strand, in a distribution box for trenched systems, or in a secured equipment or distribution box for multiple users.

It is a further aspect of the invention to provide an apparatus for managing data over a CATV system that is operationally transparent to the user and to other users on the network.

It is a further aspect of the invention to provide an apparatus for managing data over a CATV system that prevents unauthorized access to information on the network.

It is a further aspect of the invention to provide an apparatus for managing data over a CATV system that does not require any translation of data content through encryption, etc.

It is a further aspect of the invention to provide an apparatus for managing data over a CATV system that prevents ingress of noise from the user onto the network.

It is a further aspect of the invention to provide an apparatus for managing data over a CATV system that allows standardization of modem frequencies from modem manufacturers or variable modem frequencies while not requiring specific frequency allocation per user.

It is a further aspect of the invention to provide an apparatus for managing data over a CATV system that provides cost minimization/ efficiencies for modem manufacturers.

It is a further aspect of the invention to provide an apparatus for managing data over a CATV system that dynamically adjusts the allocation of the users frequency onto the network bandwidth.

It is a further aspect of the invention to provide an apparatus for managing data over a CATV system that dynamically optimizes network bandwidth for traffic utilization by user characteristics.

It is a further aspect of the invention to provide an apparatus for managing data over a CATV system that optimizes spectrum management and time management of the bandwidth.

It is a further aspect of the invention to provide an apparatus for managing data over a CATV system that does not require any frequency adjustment between the user and the cable provider such that the cable modem becomes "plug and play".

It is a further aspect of the invention to provide an apparatus for managing data over a CATV system that is compatible with either coaxial or fiber optics cable.

It is a further aspect of the invention to provide an apparatus for managing data over a CATV system that moves the control/management of information requests and delivery of information as close to the user as possible, while still retaining functional and physical security of the information.

It is a further aspect of the invention to provide an apparatus for managing data over a CATV system that distributes the data traffic management in smaller units closer to the user such that a smaller data bandwidth is required at control nodes.

It is a still further aspect of the invention to provide an apparatus for managing data over a CATV system that electrically, but not functionally, isolates the user from the data network.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE DRAWINGS

Figure 1:
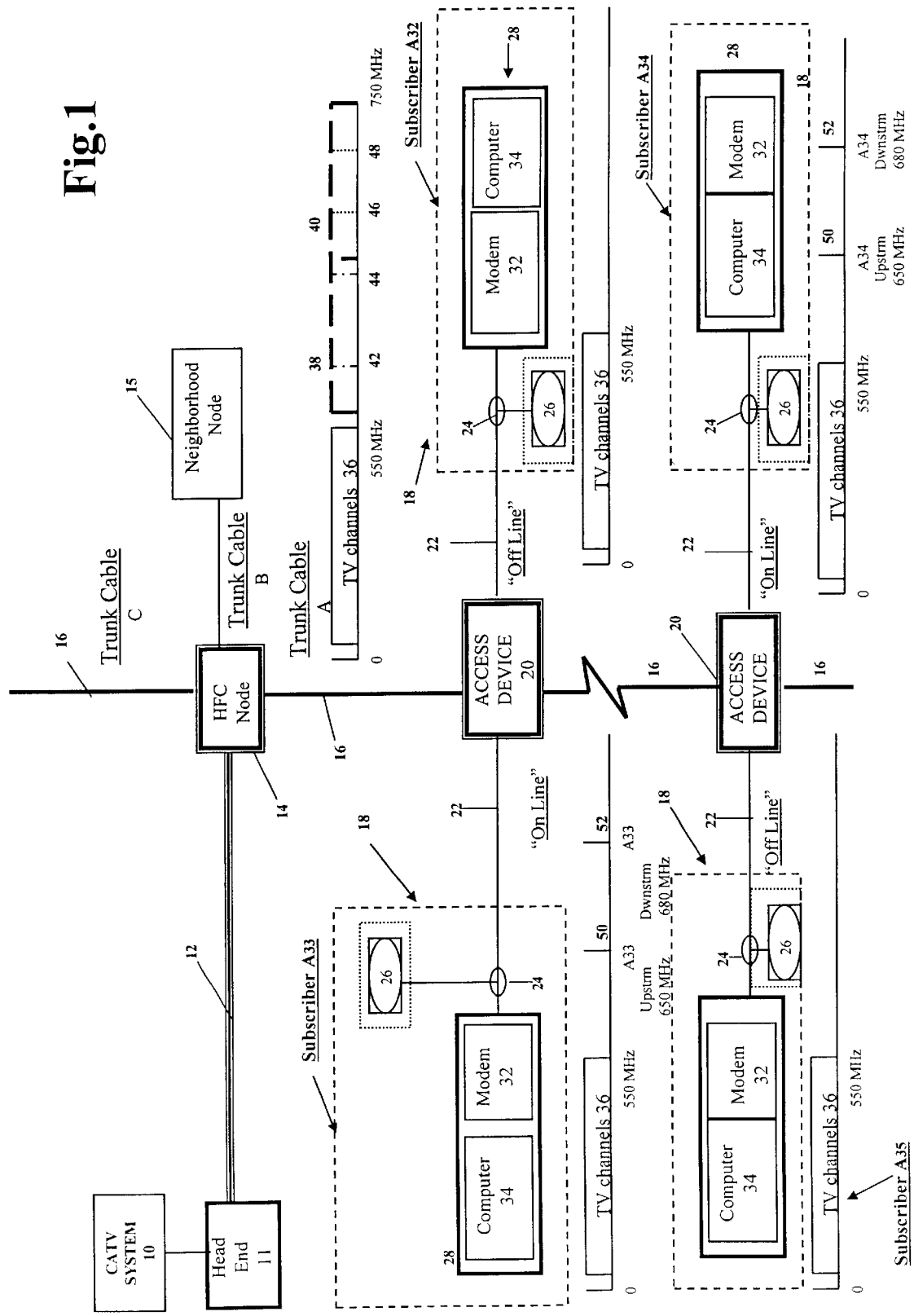
FIG. 1 is a block diagram of the system of the present invention showing the functions and frequencies of the various system components.

Referring first to FIG. 1, the cable system's hybrid fiber cable (HFC) delivery system of the present invention is shown. The CATV system 10 connects into the Internet at the cable head end 11. The head end 11 connects through a set of fiber optics cables, 12, to a "neighborhood node" 15 through the HFC node 14. The neighborhood node 15 is defined as an area nominally including five hundred potential subscribers. At the HFC node 14, there is a transition from the optical delivery system to an r-f coaxial cable system. Various coaxail cables run from this node in a "star" configuration, each node nominally having four legs. Individual coaxial cable runs are referred to as the trunk cable 16 and are run past the individual subscribers' premises 18.

In the past, signals were delivered from the trunk cable 16 to the subscriber through a passive device that tapped into the trunk cable 16. In the system of the present invention, this passive tapping device is replaced by the access device 20. The connection to the subscriber 18 is made via the r-f drop cable 22. Cable 22 is run into the subscriber dwelling 18 to a splitter 24 that provides the signal both to the subscriber's television system 26 and computer system 28 through an internal coaxial cable wiring. The cable wiring subsequently connects to computer 34 via cable modem 32, which may or may not be internal to the Computer/Net system, 28.

The "downstream" signals on fiber optics cable 12 consist of the television entertainment channels from 50 MHz to 550 MHz, and the internet communication channels from 550 MHz to (550+(100×n)) MHz where n is the number of legs at the HFC node C. Using this equation, the communication band for a four legged node would be from 550 to 950 MHz with each leg containing 100 MHz internet segments. The "upstream" fiber cable 12 has a comparable band for upstream internet communications of 400 MHz, (100×n), that is segmented into the appropriate 100 MHz leg segments. This band can be placed anywhere within the total bandwidth of the upstream optical cable, as there are no entertainment channels on the upstream cable.

At the HFC node 14, the television channels 36 are provided on all of the respective legs A, B, C, D on the trunk cable 16. The appropriate sub-band from the downstream fiber is multiplexed, or translated, on to its appropriate leg in the 550–650 MHz band. The downstream band 38 for Leg B is carried on the downstream fiber at 650 to 750 MHz and is positioned on leg 16 at 550 to 650 MHz. Likewise, downstream band 38 is positioned at the HFC and is carried at 750 to 850 MHz for positioning on leg C 16 at 550 to 650 MHz. In a similar manner, the upstream sub-bands 40, at 650 to 750 MHz on the respective trunk cables, are positioned on the upstream fiber cable 12 in the appropriate frequency band slots. For example, on leg A the upstream band is at 650 to 750 MHz at the HFC node and therefore this band is translated into 750 to 850 MHz. This results in the entertainment TV channels 36 being placed at 50 to 550 MHz, with the downstream Internet band 38 placed at 650 to 750 MHz and the upstream Internet band 40 placed at 750 to 850 MHz on each respective leg.

At the access device 20, all of the TV entertainment channel signals 36 on the drop cable 22 are positioned from 50 to 550 MHz and are passed through and the downstream signal 42 for subscribers 33 at 550 MHz is translated to 680 MHz. This signal is provided on drop cable 22 and represents a downstream standardized signal for all modems, though arbitrarily chosen for this example. The output from the modem 32 is the upstream signal 50 at 650 MHz for Subscriber A33. This signal is placed on the drop cable 22 and is an upstream standardized signal for all modems, again arbitrarily chosen for this example.

Figure 2:
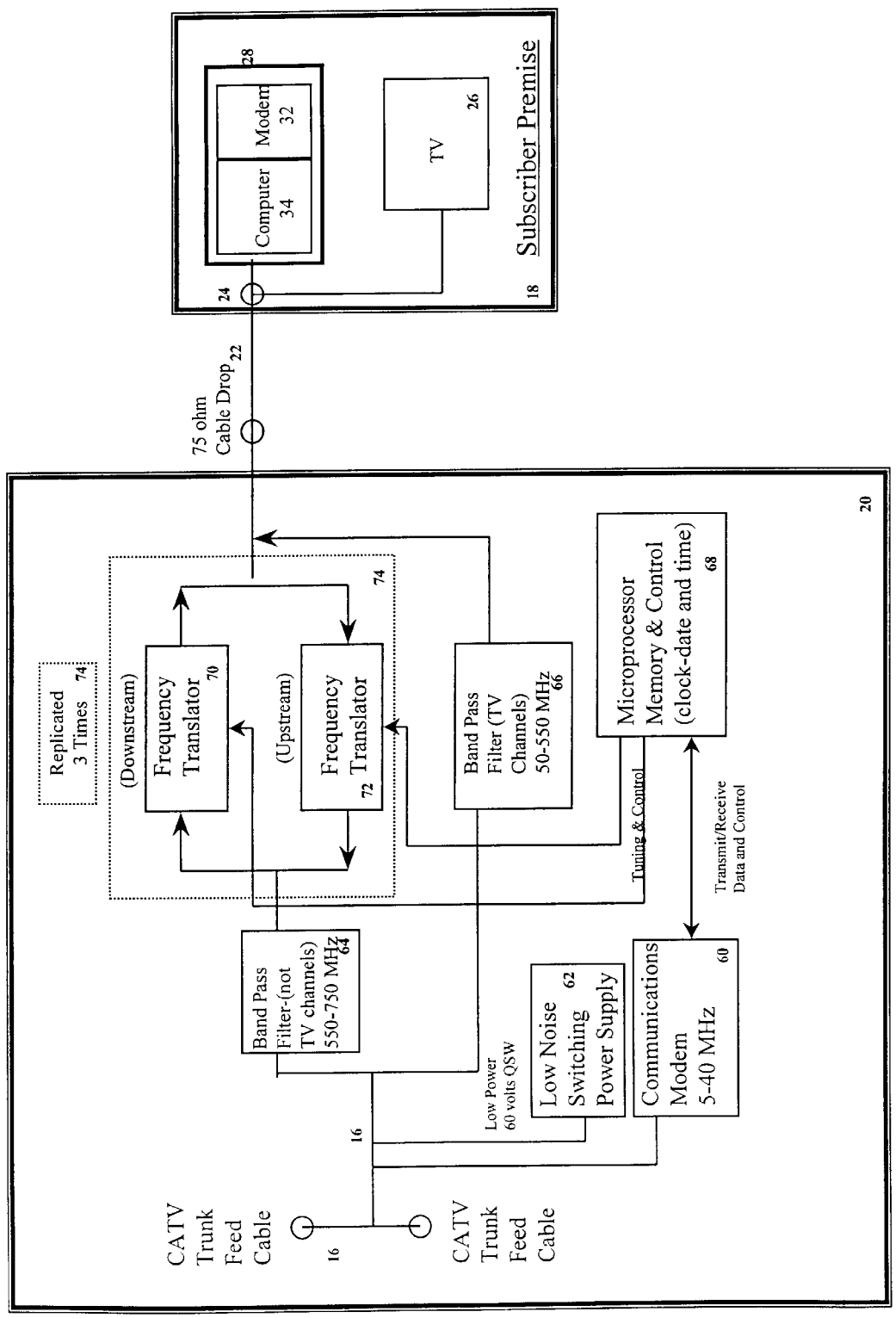
FIG. 2 is a functional block diagram of the apparatus of the present invention.

Referring now to FIG. 2, a functional diagram of the access device 20 of the present invention is shown. As described with reference to FIG. 1, the signal from CATV trunk 16 is provided to the access device 20. The trunk cable signal 16 is provided to the communications modem 60, the low noise switching power supply 62, the non-television band pass filter 64, and to the television band pass filter 66.

The low noise switching power supply 62 only recognizes and uses the low power sixty cycle quasi square wave (QSW) voltage on the trunk cable 16 and converts this QSW into the appropriate DC voltages used by the other functional units. These functional units include the microprocessor, frequency translators and communications modem. However, in other embodiments power to the access device may be supplied in other art recognized manners to achieve similar results.

The communications modem 60 is a low data rate communication service channel that is used to communicate between the head end 11 and the respective access devices 20 used in the system. This control communication takes place over a service channel in the 5–50 MHz band. The communication modem 60 provides a request for service to the head end 11, receives authorization and allocation frequency slots for both upstream and downstream frequencies for the specific subscriber, and indicates a termination of service to the head end 11. The microprocessor memory and control 68 receives and provides signals to and from the head end 11 via the communication modem 60 and provides the set-up of the appropriated frequencies in the upstream 72 and the downstream 70 translators.

The signal from cable trunk 16 is provided to the television band pass filter 66 that passes the band 50–550 MHz, representing the television entertainment channels and only these channels, through to the subscriber drop cable 22. This allow the pass through of the television entertainment channels with no interference or modification.

The signal from the cable trunk 16 is also provided to the non-television band pass filter 64, which is a bi-directional filter passing signals in the 550–750 MHz band. The non-television band pass filter 64 is connected to the downstream and upstream frequency translators 70, 72. Downstream frequency translator 70 selects and translates a specific frequency in the 550–650 MHz band, that the microprocessor 68 has instructed it to use, into the standardized 680 MHz frequency that the cable modem 32 is expecting. In a similar manner, the upstream frequency translator 72 receives the standardized upstream frequency signal at 650 MHz from the cable modem 32 and translates it into the specific frequency in the 650–750 MHz band. Here, the microprocessor 68 controls the specific frequency based upon the requirements of the head end 11. The resulting signal is subsequently provided to the non-television band pass filter 64.

The frequency translators 70, 72 are replicated as indicated three times to feed four subscribers from each preferred access device 20. All other functional elements of access device 20 are common elements that are shared in delivering the services to the respective subscribers. This allows economy of cost, power, equipment, size, and installation. However, it is understood that the number of subscribers per access device is dependent solely by the number of drop cables capable of attachment and access devices capable of serving more than four subscribers is contemplated by the invention.

Once passing through the access device 20, the signals on the consumer drop cable 22 to each consumer are the television entertainment channels, in the 50–550 MHz band and, if the communication channel is being used, the communication standardized signals at 650 MHz upstream and 680 MHz downstream. The signals pass through the subscriber drop cable 22 and are subsequently split by a splitter 24 to provide the signals to the subscriber's television 26 and to the computer through the subscriber's cable modem 32.

Figure 3:
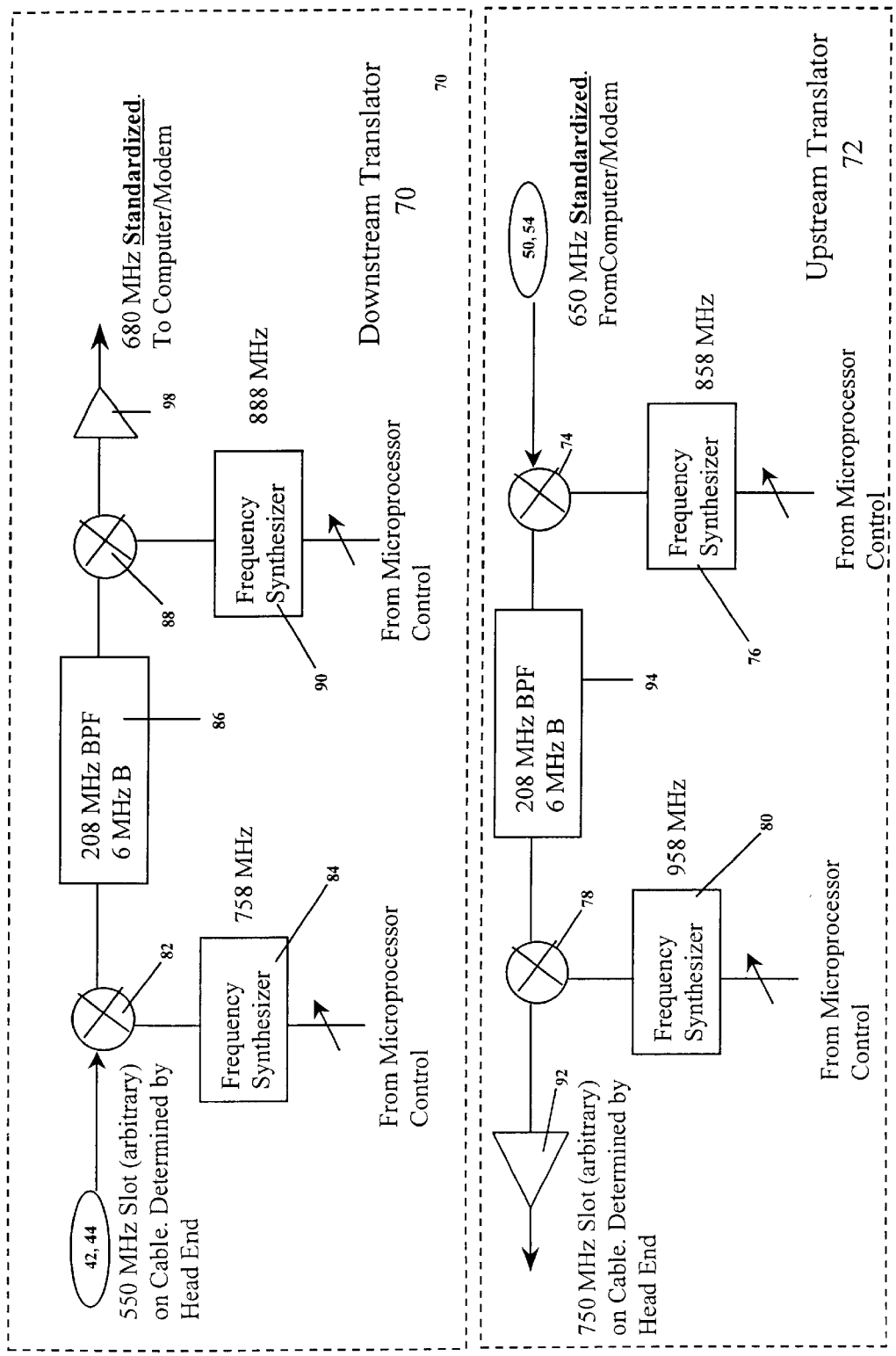
FIG. 3 is a block diagram of the frequency translators of the present invention.

Referring now to FIG. 3, the operation of the upstream and downstream translators 72, 70 is described in greater detail. The upstream translator 72 receives signals 50, 54 at a standardized 650 MHz from the subscriber's computer modem 28. This signal is provided to one input side of a mixer 74 while the other input side of the mixer 74 receives a microprocessor controlled signal from the frequency synthesizer 76 at 858 MHz, the result of the arbitrary selection of the 750 MHz upstream slot. In the preferred embodiment, mixer 74 is a standard radio frequency mixer for displacing the input signal a predetermined amount, between 50 MHz to 1 GHz, dependent upon the particular harmonics of the input signals. The output of mixer 74 is then fed to an output band pass filter 94, that has a center frequency of about 208 MHz and a bandwidth of about 6 MHz. The output of this output band pass filter 76 is then fed to a second mixer 78. The other input from frequency synthesizer 80 positions the output signal through the amplifier 92 to the allocated upstream frequency bands 46, 48 that were allocated to this specific subscriber from the head end 11.

The downstream translator 70 works in a manner similar to the upstream translator. The signal to the input side of mixer 82 is within the specific frequency bands 42, 44 allocated to the subscriber by the head end 11. The frequency of the other input is from the frequency synthesizer, 84, that has been established by the microprocessor, 68, consistent and dependent upon the frequency provided from the head end, 11. The output of the mixer, 82, will pass through the output band pass filter 86, which has a 6 MHz bandwidth. The output of the bandpass filter, 86, is provided to mixer, 88. The other input side of mixer, 88, is from frequency synthesizer, 90, whose frequency control has been provided from the head end, 11. The output to amplifier, 98, is 680

MHz, 52 and 56, the standardized (arbitrary) frequency to the computer modem, 32.

As described above, the access device of the present invention has many advantages over current systems. First, the access device isolates the subscriber electrically from the network while not impairing the function of the data network itself, converting the network from a "broadcast LAN" to a narrowcast communication system and providing connectivity security to the subscriber. Second, the access device allows fall utilization of the communication spectrum instead of a limited and constrained use of the available bandwidth, standardizing the system and allowing "plug and play" modem operation. Third, when the low noise switching power supply is utilized, the invention suppresses noise ingress onto the network (Trunk) at the invention by isolating the network from the subscriber's power source(s). Fourth, the access device of the present invention isolates the communication band and the TV Entertainment bands from the each other in the delivery to the subscriber's premise, passing all of the TV Entertainment channels through to the subscriber unhindered or modified. Finally, the access device of the present invention allows for enhanced security without altering signal content, either through encryption or through other means.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An access device for managing television and data signals from a cable television network signal, said access device comprising:

an upstream frequency translator for translating a subscriber service request signal to a first predetermined frequency;

a communications modem for sending said translated subscriber request signal to a data source, receiving a cable television network signal from said data source, receiving an authorization to utilize a transmit signal frequency and a receive signal frequency, and sending a subscriber termination signal to indicate a termination of service;

a television band pass filter for filtering a television signal from said cable television network signal;

a non-television band pass filter for filtering a data signal to and from said cable television network signal;

a downstream frequency translator for translating said data signal from said cable television network signal to a second predetermined frequency; and a microprocessor for allocating frequency slots for said subscriber, setting said upstream frequency translator to translate said subscriber service request signal to said first predetermined frequency, and setting said downstream frequency translator to translate said data signal to said second predetermined frequency;

wherein said access device accepts a service request signal from said subscriber, translates said service request signal to a first predetermined frequency, sends said service request signal through said communications modem, accepts a cable television network signal, filters a television signal from said cable television network signal, filters a data signal from said cable television network signal, translates said data signal to a second predetermined frequency, and sends said translated data signal to said subscriber.

2. The access device as claimed in claim 1 further comprising a second upstream frequency translator and a second downstream frequency translator for accepting and translating signals to and from at least a second subscriber.

3. The access device as claimed in claim 2 further comprising a third and a fourth upstream frequency translator and a third and a fourth downstream frequency translator for accepting and translating signals to and from a third and a fourth subscriber.

4. The access device as claimed in claim 1 wherein said television band pass filter filters a television signal having a frequency band of about 50 to about 550 MHz.

5. The access device as claimed in claim 1 wherein said non-television band pass filter filters a data signal having a frequency band of about 550 to about 750 MHz.

6. The access device as claimed in claim 1 wherein said downstream frequency translator translates said data signal to a frequency band of between about 650 MHz and about 750 MHz.

7. The access device as claimed in claim 1 wherein said upstream frequency translator translates said service request signal to a frequency of between about 550 to about 650 MHz.

8. The access device as claimed in claim 1 wherein said upstream frequency translator and said downstream frequency translator each comprise a pair of mixers, a bandpass filter disposed between said pair of mixers, a pair of frequency synthesizers for translating a signal to a predetermined frequency, and an amplifier for amplifying said signal.

9. The access device as claimed in claim 1 further comprising a low noise switching power supply for converting a quasi square wave to a direct current voltage.

10. A cable television communications network comprising:

a cable head end in communication with a television source and a data source;

a trunk feed cable in communication with said cable head end for feeding a cable television network signal containing a television signal and a data signal to at least one subscriber;

at least one access device in communication with said trunk feed cable, said access device comprising;

an upstream frequency translator for translating a subscriber service request signal to a first predetermined frequency;

a communications modem for sending said translated subscriber request signal to a data source, receiving a cable television network signal from said data source, receiving an authorization to utilize a transmit signal frequency and a receive signal frequency, and sending a subscriber termination signal to indicate a termination of service;

a television band pass filter for filtering a television signal from said cable television network signal;

a non-television band pass filter for filtering a data signal from said cable television network signal;

a downstream frequency translator for translating said data signal from said cable television network signal to a second predetermined frequency; and a microprocessor for allocating frequency slots for said subscriber, setting said upstream frequency translator to translate said subscriber service request signal to said first predetermined frequency, and setting said downstream frequency translator to translate said data signal to said second predetermined frequency; and at least one drop cable in communication with said access device for transmitting said television signal and said translated data signal from said access device to said subscriber and for sending said service request signal from said subscriber to said access device; and a subscriber cable modem in communication with said drop cable for receiving and converting said translated data signal from said access device into a computer readable form and for converting a service request signal from said computer and sending said converted signal to said access device;

wherein said subscriber sends a service request from said computer, said subscriber cable modem converts said service request signal from said computer and sends said converted signal through said drop cable to said access device, said access device translates said service request signal to a first predetermined frequency and sends said service request signal through said communications modem to said data source via said trunk cable and said head end, said data source responds to said service request signal and sends data authorization slot allocation frequency signals through said trunk cable to said access device, said access device filters a television signal and a data signal from said cable, translates said data signal to a second predetermined frequency, and sends said translated data signal to said subscriber cable modem, and said subscriber cable modem converts said translated data signal into a computer readable form and sends said converted data signal to said computer.

11. The cable television communications network as claimed in claim 10 wherein said access device further comprises a second upstream frequency translator and a second downstream frequency translator for accepting and translating signals to and from at least a second subscriber.

12. The cable television communications network as claimed in claim 11 further comprising a third and a fourth upstream frequency translator and a third and a fourth downstream frequency translator for accepting and translating signals to and from a third and a fourth subscriber.

13. The cable television communications network as claimed in claim 10 wherein said television band pass filter of said access device filters a television signal having a frequency band of about 50 to about 550 MHz.

14. The cable television communications network as claimed in claim 10 wherein said non-television band pass filter of said access device filters a data signal having a frequency band of about 550 to about 750 MHz.

15. The cable television communications network as claimed in claim 10 wherein said downstream frequency translator of said access device translates said data signal to a frequency band of between about 650 MHz and about 750 MHz.

16. The cable television communications network as claimed in claim 10 wherein said upstream frequency translator of said access device translates said service request signal to a frequency of between about 550 to about 650 MHz.

17. The cable television communications network as claimed in claim 10 wherein said upstream frequency translator and said downstream frequency translator of said access device each comprise a pair of mixers, a bandpass filter disposed between said pair of mixers, a pair of frequency synthesizers for translating a signal to a predetermined frequency, and an amplifier for amplifying said signal.

18. A method of processing a service request from a data source and for communicating data and television signals through a cable television network, said method comprising the steps of:

sending a service request signal from a subscriber cable modem to an access device;

translating said service request signal to a first predetermined frequency;

sending said service request signal through a communications modem to said data source;

sending a cable television network signal containing a response signal from said data source and a television signal to said access device;

filtering said television signal and said data signal from said cable television network signal;

translating said data signal to a second predetermined frequency; and sending said translated data signal to said subscriber cable modem.

* * * * *